United States Patent [19]
Davies

[11] 3,854,132
[45] Dec. 10, 1974

[54] RADAR SYSTEMS
[75] Inventor: Eric Davies, Danbury, England
[73] Assignee: The Marconi Company, Limited, Chelmsford, Essex, England
[22] Filed: May 21, 1973
[21] Appl. No.: 362,396

Related U.S. Application Data
[63] Continuation-in-part of Ser. No. 161,288, July 6, 1971, abandoned.

[52] U.S. Cl. ......... 343/5 PD, 343/16 R, 343/17.1 R
[51] Int. Cl. .............................................. G01s 9/02
[58] Field of Search ......... 343/16 R, 16 M, 17.1 R, 343/5 PD

[56] References Cited
UNITED STATES PATENTS

| | | | |
|---|---|---|---|
| 2,426,460 | 8/1947 | Lewis | 343/16 R |
| 3,107,351 | 10/1963 | Milam | 343/16 M |
| 3,300,768 | 1/1967 | Bystrom et al. | 343/5 PD |
| 3,308,456 | 3/1967 | Levenson et al. | 343/7 A |

Primary Examiner—Malcolm F. Hubler
Attorney, Agent, or Firm—Baldwin, Wight & Brown

[57] ABSTRACT

The invention relates to within pulse radar systems in which spurious signals due to grating lobes are reduced. A plurality of stationary receiving aerial arrays each survey a separate sector, and a plurality of transmitting aerials are each arranged to illuminate an area which includes substantially half of one sector and an adjacent half of a second sector with pulse energy. The aerial arrays are scanned electronically and are constructed such that the main receiving lobes and associated grating lobes thereof never fall simultaneously in the same area illuminated by one transmitting aerial.

18 Claims, 6 Drawing Figures

PATENTED DEC 10 1974 3,854,132

SHEET 1 OF 4

RADAR SYSTEMS

CROSS REFERENCE TO RELATED APPLICATION

This application is a continuation-in-part of my copending application Ser. No. 161,288, filed July 6, 1971, now abandoned.

BACKGROUND OF THE INVENTION

This invention relates to radar and like systems of the type in which an area of surveillance is periodically flooded with a broad transmitted beam of RF pulse energy and a stationary receiving antenna array, or arrays, is caused electronically to scan the area of surveillance. This general type of arrangement is disclosed in U.S. Pat. No. 2,426,460 and a preferred embodiment of this invention employs radar techniques such as are disclosed in the Proceedings of the IEEE Volume 56, No. 11, Nov., 1968 beginning at page 1801 and entitled Phased-Array Beam Steering By Multiplex Sampling, by Major A. Johnson.

Thus, this invention relates to radar systems, and more specifically to radar systems employing what is herein called "within-pulse" scanning. In such radar systems information received on an aerial array is scanned repetitively, each scan having a duration less than or equal to the duration of the transmitted pulse. The transmitted prf need not be in synchronism with the receiver scanning unless range information is desired.

Each receiving aerial array has a lobe pattern associated with it and aerial arrays used with within-pulse radar systems are designed to have one long narrow lobe. The information received by the aerial array is scanned by feeding the signal received by each element of the array to a separate receiver, each receiver having a local oscillator, the frequency of which differs from that of the next oscillator by $1/t$, where $t$ is the duration of the transmitted pulse. In this way the lobe is effectively scanned across an area of surveillance. For the sake of brevity of reference such radar systems employing within-pulse scanning will be hereinafter referred to as "within-pulse" radars.

Within-pulse radars are normally required to scan in azimuth, and for practical reasons the scan is limited to ±45°—it thus being customary to scan four quadrants to give complete all-round surveillance. Current practice is to flood each quadrant with a broad transmitted beam and then scan it several times before flooding the next quadrant with a transmitted beam . . . and so on.

The optimum element spacing of the elements of the aerial array for achieving electronic scanning of the receiving lobe of the array by ± 45° is 0.707λ (where λ is the wavelength of the transmitted pulse). However, this spacing gives rise to two separate lobes, separated by 90°. The unwanted lobe is commonly called a "grating lobe." Thus when one lobe is at either +45° or −45° there will be another receiving aerial lobe in the illuminated quadrant, and ambiguous signals will be received.

One possible solution to this problem is to reduce the spacing of the elements of the aerial array to 0.6 λ. If this is done when the main lobe is at +45° the grating lobe is at −74°, and when the main lobe is at −45° the grating lobe is at +74°. Thus if the quadrant between the limits ± 45° is illuminated and the area outside the limits ± 74° is not illuminated by the transmitter beam no targets scanned by the grating lobe will be illuminated, and thus no spurious signals will be received.

This solution suffers from the major disadvantage that in order to have an aerial array of sufficient aperture more aerial elements have to be provided, and consequently more receiving channels, than if the aerial element spacing were 0.707 λ. In the example an increase of 18 percent is experienced in the number of channels and the bandwidth of the subsequent signal processing also has to be increased by a similar amount. A further disadvantage is that an aerial array with closer element spacing than 0.707 λ will "overscan." For example, with the 0.6 λ spacing mentioned above, the main lobe will scan the region ±57° during each scanning period, signals received from outside the ±45° quadrant of the area of surveillance being rejected during signal processing.

It is an object of this invention to provide a within-pulse radar system in which grating lobe effects are reduced without involving the above mentioned disadvantages.

BRIEF SUMMARY OF THE INVENTION

The basic concept according to this invention concerns the combination of a transmitter means which floods a broad area of surveillance and a pair of stationary receiving aerial arrays positioned to scan separate sectors each only partially overlapping the area of surveillance and each of which arrays recovers part of the useful information relating to the area of surveillance. In this manner, a main receiving lobe and corresponding grating lobe are never simultaneously present in the area of surveillance and ambiguity which could arise from such simultaneous presence is eliminated. The arrangement allows optimal spacing between elements of the aerial arrays and the advantages attendant thereupon and also allows the aerial arrays to be so oriented with respect to each other and to the transmitted pulse lobe that the undeflected main receiving lobes of the arrays lie on the perimeters of the transmitted lobe while fully deflected positions of the main receiving lobes lie on the axis of the transmitted lobe. Such orientation provides a uniform level of received signals because the fully deflected receiving lobes suffer a 3 db loss compared with their undeflected positions and the perimeters of the transmitted lobe suffer a 3 db loss compared with the axis thereof.

A within-pulse radar system according to this invention may comprise a plurality of receiving aerial arrays, each positioned to survey a separate sector of an area of surveillance, and a plurality of transmitting aerials, each positioned to transmit a pulse of energy into an area which includes substantially half of one sector surveyed by one of said receiving aerial arrays and an adjacent half of a second sector surveyed by a second one of said aerial arrays.

More particularly, the present invention is concerned with a system in which a pair of electronically scanned receiving means are caused to scan adjacent sectors of an area of surveillance in which the adjacent halves of the two sectors are illuminated by transmitting means, the receiving means being detailed each to scan progressively over its sector and such that the main receiving lobe and the grating lobe never fall simultaneously in the same half of the sector. The two receiving means are scanned in fixed relation to each other and means is provided sequentially to recover for use the information obtained when the two receiving means scan their main receiving lobes through those halves of the sectors illuminated by the transmitting means.

The fixed relation of scanning may be such as leads inherently to obtaining the useful information sequentially from the two receiving means. Alternatively, the useful information recovered sequentially may be obtained during simultaneous periods from the two receiving means, in which case the information obtained from one receiving means is delayed in recovery by one-half of a scan period.

The total area of surveillance may be increased by adding a further or third receiving means which pairs up with the second of the first two receiving means. In this case, a second transmitter means is employed to flood the unused half of the sector scanned by such second receiving means and the adjacent half sector of the third receiving means. By adding a fourth receiving means and providing two additional transmitting means, and entire 360° area of surveillance may be covered.

In one embodiment of the invention each of the transmitting aerials is arranged to transmit a pulse in turn, each receiving aerial array which surveys portions of the area illuminated being scanned a plurality of times before the next pulse is transmitted by the next transmitting aerial. Preferably signals derived from each receiving aerial array are switched so that signals received by the arrays from each area illuminated by a pulse transmitted by one transmitting aerial are utilized, and signals received by the array from areas not illuminated by the pulse transmitted by said one transmitting aerial are not utilized.

In another embodiment of the invention each transmitter aerial is arranged to transmit a pulse of a different frequency, and each receiving aerial is provided with means for receiving echo signals of the two frequencies being transmitted into the sector of the area of surveillance which that aerial array surveys. Preferably switching means are provided for selecting the desired information from the outputs of the receiving means.

Preferably each sector is a quadrant and preferably each area into which energy is transmitted is also a quadrant. Preferably the sector quadrants are displaced from the transmitted energy area quadrants by an angle of approximately 45°.

BRIEF DESCRIPTION OF THE DRAWING FIGURES

Figure 1:
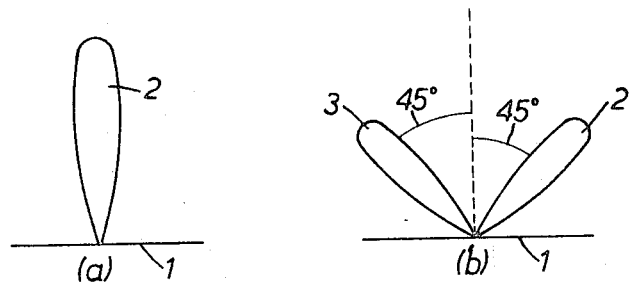
FIG. 1 shows two polar diagrams of an aerial array.

FIG. 1a shows a receiving aerial array 1, which is represented by a straight line. The actual aerial would consist of a plurality of receiving horns. The aerial array has a lobe pattern, and the receiving lobe 2 is shown directed perpendicularly to the aerial array. The aerial is such that reflected signals coming from targets within the lobe in this position are received with minimum loss.

FIG. 1b shows the receiving aerial array 1 when the lobe 2 has been scanned to the +45° position. Signals reflected from targets within the lobe when it is in this position are received with a loss of 3 db as compared to signals from similar targets when the lobe is perpendicular to the aerial array. When the lobe 2 has been deflected to +45° a grating lobe 3 apperars at −45°, and if the quadrant ±45° has been illuminated by a transmitted pulse signals will be received from targets present in both the lobe 2 and the grating lobe 3 — leading to an ambiguity.

Figure 2:
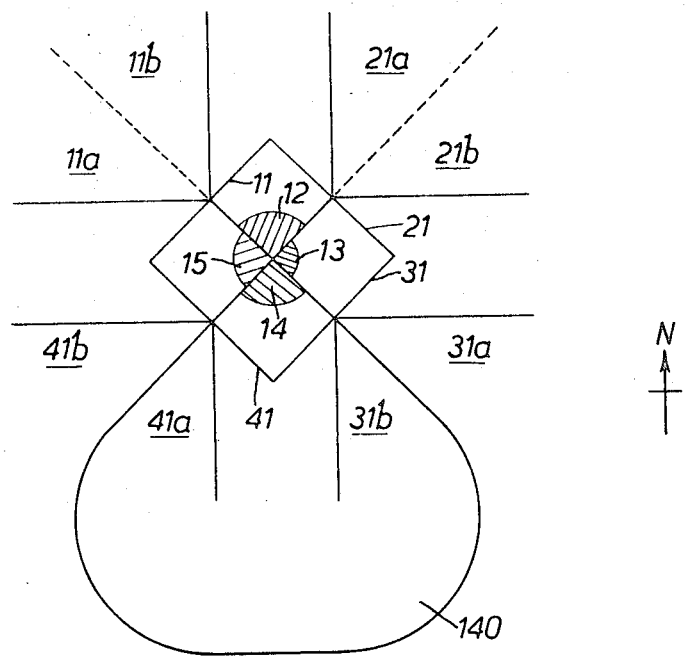
FIG. 2 is a diagrammatic representation of a radar transmitter and receiver aerial system for use in the present invention.

FIG. 2 shows an aerial system for use in the present invention. There are four receiving aerial arrays, 11, 21, 31, 41, each positioned to receive signals from a different quadrant of an area of surveillance, and there are four transmitting aerials 12, 13, 14, 15, each positioned to transmit pulses into further different quadrants of the area of surveillance. It can be seen that the two sets of quadrants are displaced by 45°.

In one mode of operation of such a system one transmitting aerial, 12 say, would transmit a pulse which will illuminate portions of the areas scanned by the receiving arrays 11 and 21. The lobes of both of the receiving arrays are made to scan their respective quadrant simultaneously. Thus, while the lobe of array 21 is scanning area 21a, which has been illuminated by the transmitted pulse, the lobe of array 11 is scanning area 11a which has not been illuminated by the pulse. The signals derived from array 21 during this time are fed to a signal processor, while the signals derived from array 11 are discarded. As each scan continues, the lobe of array 21 will scan the area 21b which was not illuminated by the transmitted pulse, while the lobe of array 11 is scanning the area 11b, which was illuminated by the transmitted pulse. During this period the signals derived from array 11 are fed to the signal processor, while the signals derived from array 21 are discarded. The scanning period for each of the arrays 11 and 21 is equal to the pulse duration of the transmitted pulses and it will be seen that during sequential scanning periods of the arrays the information recovered from the areas 21a and 11b will inherently occur sequentially so that the information may be used cumulatively to provide a single display. Were the two arrays to be scanned in opposite angular directions, i.e. the array 11 scanning the areas 11a and 11b while the array 21 scans the area 21b and 21a, the useful information obtained while the main receiving lobes scan the areas 11b and 21a would occur simultaneously and the data from one area 11b or 21a would be required to be delayed in order to provide a full scan period display.

Figure 4:
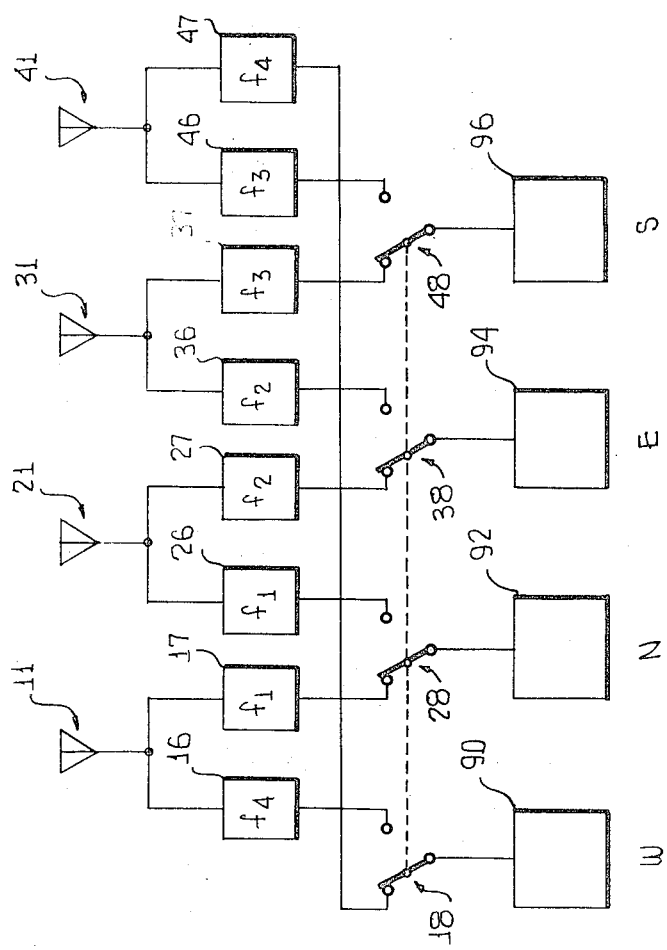
FIG. 4 is a diagram illustrating certain principles of the invention in one embodiment thereof.
Figure 4:
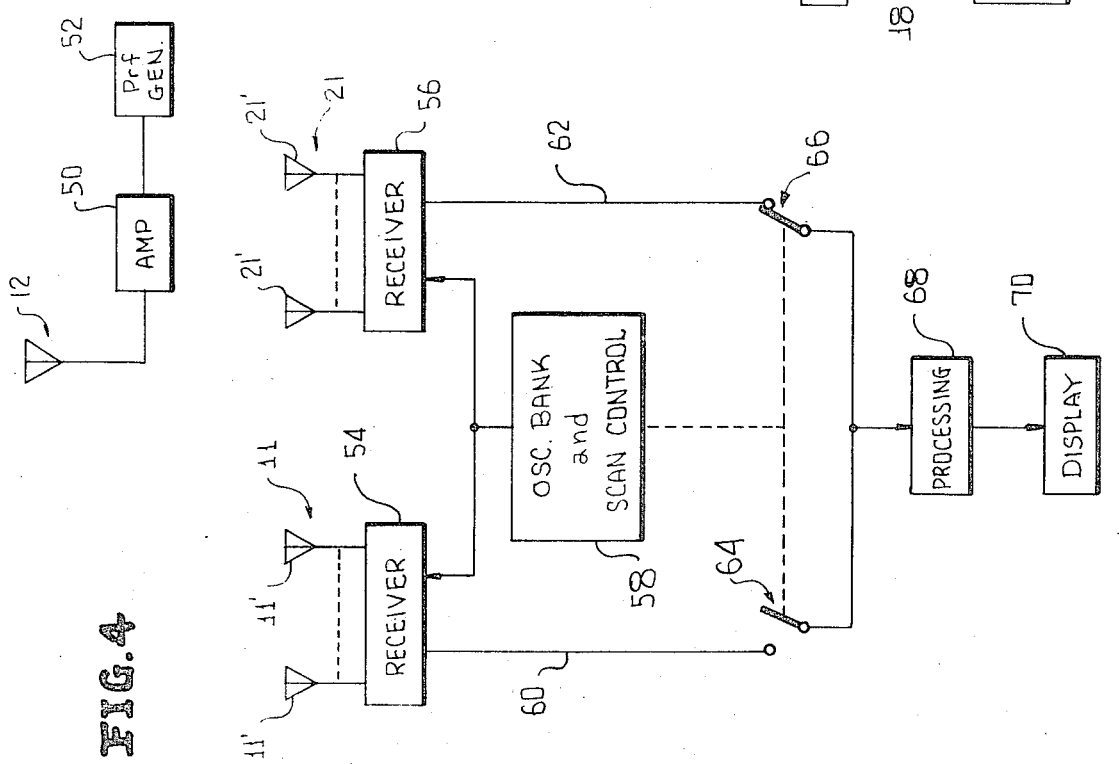

To illustrate the principles in greater detail, reference is had to an embodiment employing a single transmitter and two receiving arrays as in FIG. 4 wherein the individual elements of the arrays 11 and 21, the receiving horns mentioned above, are indicated by reference characters 11' and 21' respectively. The transmitter means includes the aerial 12, the amplifier 50 and the prf generator 52. In the system shown, no range information is recovered so that no synchronization between transmission and reception is employed.

The elements of the array 11 are associated with the receiver 54 whereas those of the array 21 are associated with the receiver 56. In the interest of economy, the local oscillators associated with the elements of the arrays are not incorporated directly in the respective receivers 54 and 56 but are provided as a common bank of oscillators in the circuitry 58 which also includes the requisite control to achieve simultaneous scanning by the arrays 11 and 21. (In the embodiment of FIG. 2, of course, all of the receiving arrays would be involved.) The scanning and receiving techniques are conventional and preferably are as described in the aforementioned IEEE article which is incorporated herein by reference.

The information received by the arrays 11 and 21 appears at the outputs 60 and 62 thereof and such information is applied through switches 64 and 66 to the processing circuitry 68 for display on a suitable display device 70. The processing and display devices 68 and 70 are of conventional form.

The switches 64 and 66 may be of any suitable form such as electronic devices and are operated at the scanning frequency. Thus, during the time during which the main receiving lobe of the array 21 is scanning the area 21a of FIG. 2 the information obtained from the receiver 56 is processed and displayed and during the immediately following time during which the main receiving lobe of the array 11 is scanning the area 11b the information from the receiver 54 is switched in for processing and display. Thus, information obtained from the receiver 54 is not used during that time in which ambiguous information could occur by presence of the grating lobe of the array 11 in the area flooded by the transmitter means, and similarly with respect to the array 21 and its receiver 56.

Returning to FIG. 2, after a large number of scans are performed by the arrays 11 and 21, a pulse is transmitted by transmitting array 13. Scanning is then carried out by arrays 21 and 31, signals derived from the areas 21b and 31a being utilized, and those derived from 21a and 31b being discared.

Pulses are then transmitted in turn from tansmitting aerials 14 and 15, and similar scanning by arrays 31, 41 and 41, 11 takes place to complete a full 360° surveillance. In using such a system a uniform level of received signals is achieved since the fully deflected lobe of the receiving aerial array, which suffers a 3 db loss, lies on the axis of the transmitted pulse lobe, which suffers no such loss. Conversely, the undeflected lobe of the receiving aerial array lies on the perimeter of the transmitted pulse lobe, which has a loss of 3 db compared with its axis. A transmitted pulse lobe is indicated at 140 in FIG. 2.

Figure 5:
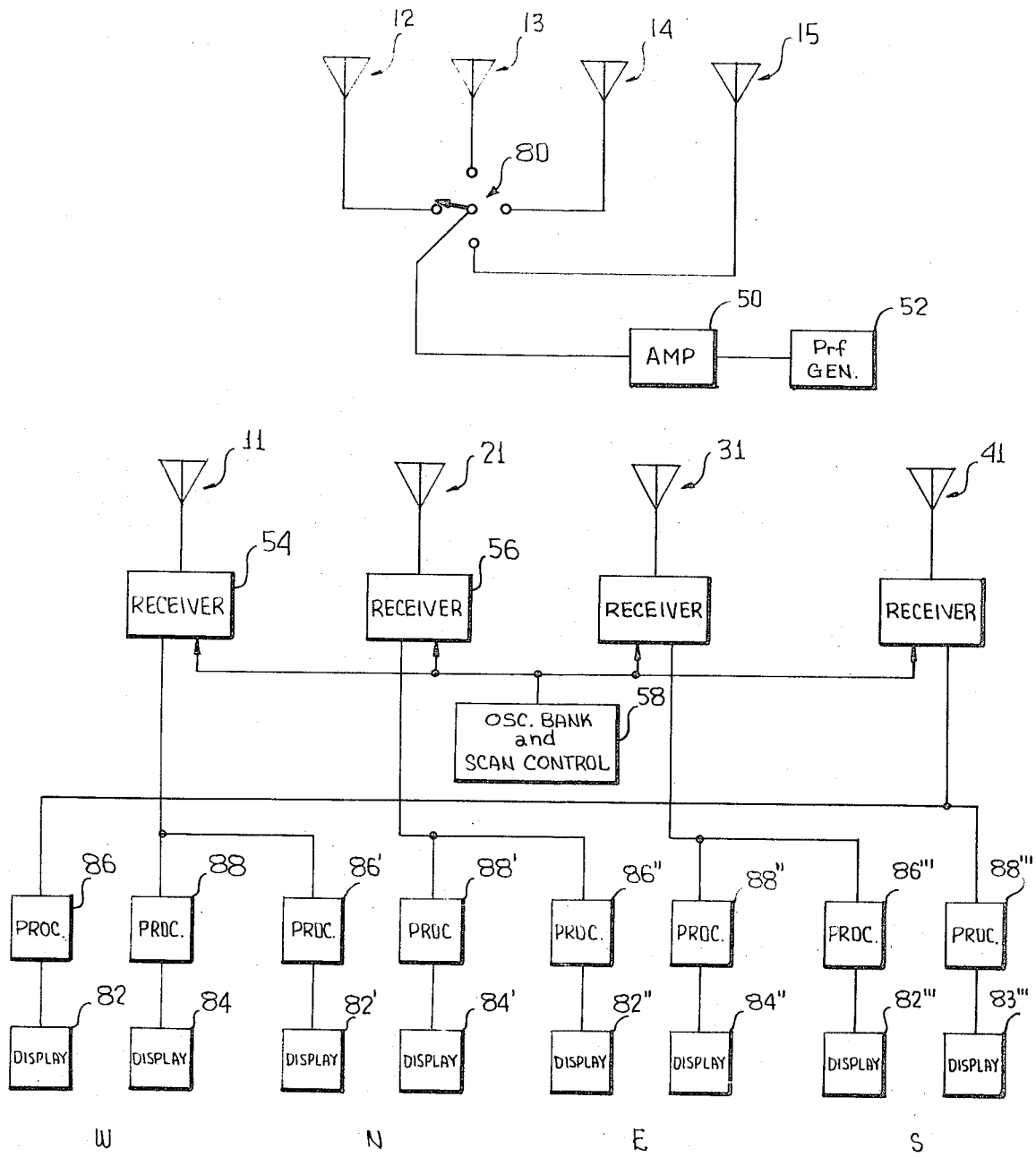
FIG. 5 is a diagram illustrating another embodiment of the invention.

FIG. 5 illustrates a system as described above in conjunction with FIG. 2 but illustrating a modification in which the gating of FIG. 4 is not employed. Since the areas of surveillance are flooded at different times by the aerials 12, 13, 14 and 15 as is indicated by the stepping switch 80, the information regarding each quadrant may be displayed continuously employing two display devices for each quadrant. Thus, for the West display, two display devices 82 and 84 and associated processing circuits 86 and 88 are used. Single, double and triple prime reference characters are used for corresponding units of the North, East and South channels.

To illustrate the utility of such an arrangement, assuming a clockwise scanning for each of the arrays 11, 21, 31 and 41 and with the aerial 15 only being operative, it will be seen that at the beginning of scan, the grating lobe of the array 41 will lie in the area 41b of FIG. 2. Spurious information resulting from this grating lobe will be displayed at this time on the device 82. At the same time, the main receiving lobe of the array 11 will lie in the area 11a and useful information will be displayed on the device 84. Useful information will continue to be displayed on the device 84 for one-half the scan cycle and useful information will then be displayed on the device 82 for the remainder of the scan cycle. At the end of the scan cycle, the grating lobe of the array 11 will lie in the illuminated area 11a but occurs in the non-useful half of the display on device 84. At the same time, the grating lobe of the array 41 will lie in the area 41a which is outside the illuminated area and no spurious information can occur. Thus, but disregarding or masking off one half of each display, an accurate composite display is obtained from the two devices 82 and 84.

This modification is described to emphasize the importance of providing an arrangement wherein the main receiving lobe and grating lobe of an array never fall simultaneously in the illuminated area.

When the switch 80 causes the aerial 12 to illuminate the areas 11b and 21a, useful North quadrant information is displayed on the devices 82' and 84', and so on for the East and South displays as well.

In one embodiment of the invention each transmitting aerial 12, 13, 14, 15 transmits pulses of different frequency and it is possible to illuminate the whole of the 360° area of surveillance at once, provided that the receivers used with each of the receiving aerial arrays can receive signals of both of the frequencies transmitted into the quadrant which they scan.

Figure 3:
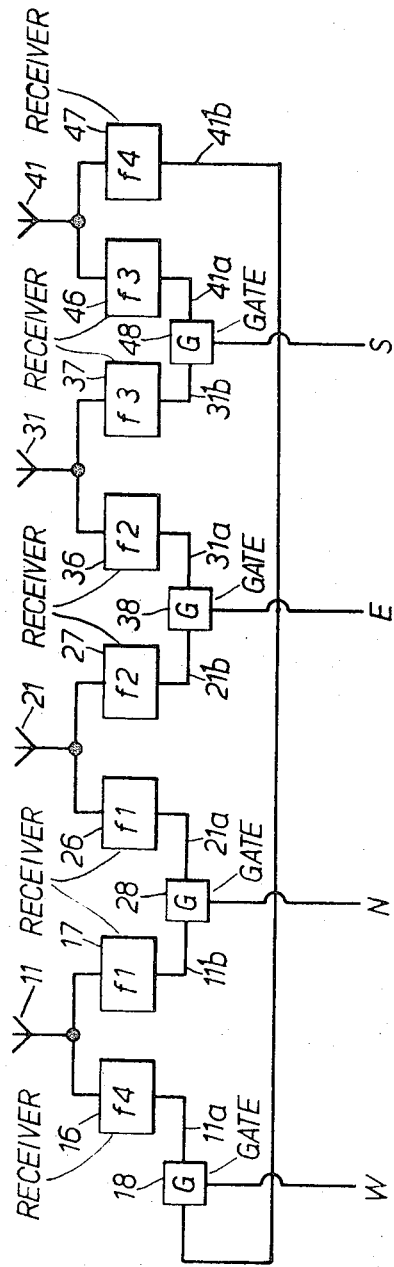
FIG. 3 is a block diagram of one embodiment of the invention.

FIG. 3 is a partial block diagram of one such embodiment of the invention. It will be understood that the four transmitting aerials will be driven by a common prf generator simultaneously to transmit pulses of the four different frequencies. Each aerial array 11, 21, 31 and 41 is associated with two receivers, each of which receives signals of a different frequency. Aerial array 11 is connected to receivers 16 and 17. Receiver 16 receives signals of frequency f4 transmitted by the aerial 15 and receiver 17 receives signals of fl transmitted by the aerial 11. The outputs of the receivers are connected to switching gates 18, 28, 38 and 48.

In operation the transmitted arrays 12, 13, 14 and 15 each transmit a pulse respectively of frequency f1, f2, f3 and f4 simultaneoulsy, Each of the aerial arrays begins to scan, and while the receiver array lobes are in the areas 11a, 21a, 31a and 41a the receivers 16, 26, 36 and 46 will be receiving desired information. The gates 18, 28, 38 and 48 switch the outputs of these receivers to a signal processor (not shown). When the receiver array lobes pass into the areas 11b, 21b, 31b and 41b the receivers 17, 27, 37 and 47 receive the desired information, and the outputs of these receivers are switched by gates 18, 28, 38 and 48 to the signal processor. It can be seen that if the aerials are positioned as indicated in FIG. 2 the outputs of the gates 18, 28, 38 and 48 will respectively represent targets in the quadrants to the West, North, East and South of the aerial arrays.

Figure 6:
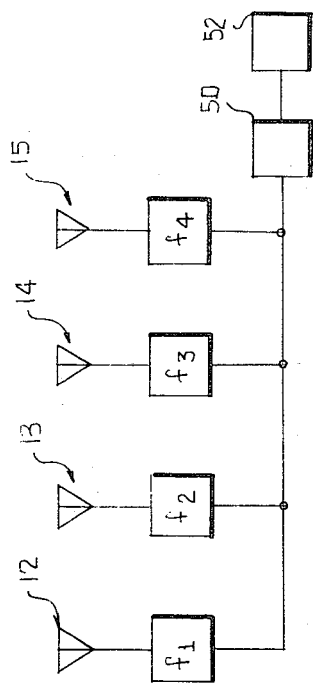
FIG. 6 is a diagram illustrating a further embodiment of the invention.

FIG. 6, although simplified for clarity by omission of the oscillator bank and control circuitry, illustrates an embodiment as described in conjunction with FIG. 3. As shown, the aerials 12, 13, 14 and 15 flood the full area simultaneously and, in contrast to the system of FIG. 5, the gating circuits 18, 28, 38 and 48 are employed so as to obtain a single, full display for each quadrant by means of the processing and display units which are shown as the single blocks 90, 92, 94 and 96. In this case, all areas may be illuminated simultaneously by virtue of the fact that each aerial transmits pulses of a frequency different from the others. Thus, the same effect is produced as if the same frequency were being used sequentially to illuminate, as in FIG. 5. Again, as in FIG. 5, a two-unit display could be used with the system of FIG. 6.

In using a system in accordance with this invention the optimum array element spacing of 0.707 λ can be used, thereby optimizing the number of receiving channels and the signal processing bandwidth.

What is claimed is:

1. A within-pulse radar system including a plurality of transmitting aerials each positioned to transmit a pulse of energy into a separate sector of an area of surveillance and a plurality of receiving aerial arrays each positioned to survey an area which includes substantially half of one sector into which a pulse of energy is transmitted by one of said transmitting aerials and an adjacent half of a second sector into which a pulse of energy is transmitted by a second one of said transmitting aerials.

2. A system as claimed in claim 1 including control means for causing each of the transmitting aerials to transmit a pulse in turn, and means for causing each receiving aerial array which surveys portions of the area illuminated to scan a pluality of times before the next pulse is transmitted by the next transmitting aerial.

3. A system as claimed in claim 1 including switching means for causing signals received by the arrays from each area illuminated by a pulse transmitted by one transmitting aerial to be utilized and for causing signals received by the array from areas not illuminated by the pulse transmitted by said one transmitting aerial to be discarded.

4. A system as claimed in claim 1 including means for causing each transmitter aerial to transmit a pulse of a different frequency, and each receiving aerial is provided with means for receiving echo signals of the two frequencies being transmitted into the sector of the area of surveillance which that aerial array surveys.

5. A system as claimed in claim 4 wherein switching means are provided for selecting the desired information from the outputs of the receiving means.

6. A system as claimed in claim 1 wherein each sector is a quadrant and each area into which energy is transmitted is also a quadrant.

7. A system as claimed in claim 6 wherein the sector quadrants are displaced from the transmitted energy area quadrants by an angle of approximately 45°.

8. A within-pulse radar system comprising, in combination:
transmitter means for flooding an area of surveillance with a broad transmitted beam of energy;
a pair of stationary receiving aerial arrays oriented with resepect to each other so as cumulatively to survey separate sectors each having a region overlapped by said area of surveillance;
each array being detailed in design to provide a narrow main receiving lobe which may be scanned angularly through the sector associated with such array and to provide during such scanning a grating lobe at a fixed angle with respect to the main receiving lobe such that the main receiving lobe and the grating lobe never fall simultaneously in the region of the associated sector overlapped by said area of surveillance;
means for causing said main receiving lobe of each array to scan angularly through its associated sector; and first means for recovering target information from the main receiving lobe of one of said receiving arrays as it is scanned through said region of its sector which is overlapped by said area flooded by the transmitter means and second means for recovering target information from the main receiving lobe of the other array as it is scanned through said region of its sector which is overlapped by said area flooded by the transmitter means.

9. In a within-pulse radar system according to claim 8 wherein the angle of scanning is approximately 90° and said fixed angle is also approximately 90°.

10. In a within-pulse radar system according to claim 9 wherein each sector half is illuminated by a pulse lobe having an axis lying along the outer perimeter of the corresponding sector half whereby a uniform level of received signals is achieved.

11. A within-pulse radar system comprising, in combination:
transmitting means for repetitively flooding a selected area of surveillance with a broad transmitted beam of RF pulse energy;
first stationary receiving means for scanning a first main receiving lobe progressively over an angle covering a first sector constituting substantially one half of said area flooded by said transmitting means and a second sector adjacent to said first sector outside of said area flooded by said transmitting means while simultaneously producing a first grating lobe which is at a fixed angle with respect to said first main receiving lobe such that when said first main receiving lobe is sweeping within said first sector said first grating lobe is sweeping only within said second sector whereby said first main receiving lobe and said first grating lobe never simultaneously fall in said area flooded by said transmitting means;
second stationary receiving means for scanning a second main receiving lobe progressively over an angle covering a third sector constituting substantially the other half of said area flooded by said transmitting means and a forth sector adjacent to said third sector outside of said area flooded by said transmitting means while simultaneously producing a grating lobe which is at a fixed angle with respect to said second main receiving lobe such that when said second main receiving lobe is sweeping within said third sector said second grating lobe is sweeping only within said fourth sector whereby said second main receiving lobe and said second grating lobe never simultaneously fall in said area flooded by said transmitting means;
said first and said second receiving means being controlled to scan in fixed relation with respect to each other; and first means and second means for recovering information regarding different targets respectively from said first and second receiving means when said first and second main receiving lobes respectively are scanning said first and third sectors.

12. A within-pulse radar system as defined in claim 11 including second transmitting means for repetitively flooding a second selected area of illumination with a broad transmitted beam of RF pulse energy, said second area being adjacent to the selected area first mentioned whereby said second sector is illuminated by said second transmitting means.

13. A within-pulse radar system as defined in claim 12 wherein the transmitting means first mentioned floods said first mentioned area with RF energy of one frequency and said second transmitting means floods said second area with RF energy of a second frequency.

14. A within-pulse radar system as defined in claim 12 wherein the transmitting means first mentioned and said second transmitting means transmit RF energy of the same frequency and including means for actuating the first and second transmitting means at different times.

15. A radar system as defined in claim 11 wherein each of said receiving means comprises an array of spaced receiving elements separated by distances substantially equal to 0.707 times the wavelength of pulses transmitted by said transmitting means.

16. A within-pulse radar system comprising, in combination:

transmitting means for transmitting RF energy pulses repetitively to flood a quadrant area of surveillance with a broad transmitted beam;

a first array of receiving aerials comprising a first series of spaced elements positioned to survey a quadrant overlapping substantially one half of said quadrant flooded by said transmitting means; the spacing between said first series of elements being such as to produce a first main receiving lobe and a first grating lobe substantially perpendicular thereto so that the first main receiving lobe and the first grating lobe never simultaneously fall within said flooded quandrant area;

a second array of receiving aerials comprising a second series of spaced elements positioned to survey a quadrant overlapping substantially the other half of said quadrant flooded by said transmitting means, the spacing between said second series of elements being such as to produce a second main receiving lobe and a second grating lobe substantially perpendicular thereto so that the second main receiving lobe and the second grating lobe never simulataneously fall within said flooded quadrant area;

means connected to said first and to said second arrays for scanning said first and said second main receiving lobes through their respective halves of said flooded quadrant; and first means and second means for recovering information regarding different targets respectively from said first and second arrays when said main receiving lobes are scanning said flooded quadrant.

17. A radar system comprising, in combination;

transmitting means for transmitting RF energy pulses repetitively to flood a selected area of surveillance;

a first array of receiving aerials comprising a series of spaced elements positioned to survey a first sectorial area overlapping substantially one half of said area a second array of receiving aerials comprising a series of spaced elements positioned to survey a second sectorial area overlapping substantially the other half of said area of illumination;

means connected to said elements of said first and said second arrays for causing respective main receiving lobes simultaneously to scan through the respective sectorial areas during which time respective grating lobes are produced at a fixed angle with respect to each said main lobe;

the spacing between said elements being such that at any time only one of each said main lobe and its respective grating lobe is in said respective sector flooded by said transmitting means; and first receiving means connected to said elements of the first array for producing output signals related to relected energy detected by said respective main receiving lobe of the first array and second receiving means connected to said elements of the second array for producing output signals related to reflected energy detected by said respective main receiving lobe of said second array; and means for separately displaying target information corresponding to the output signals of said first and second receiving means.

18. A radar system as defined in claim 17 wherein each said sectorial area is a quadrant and the spacing between said elements of each array is substantially equal to 0.707 times the wavelength of the RF pulses.

* * * * *